(12) United States Patent
Ota et al.

(10) Patent No.: US 7,948,856 B2
(45) Date of Patent: May 24, 2011

(54) MANUFACTURING METHOD OF AN OBJECTIVE LENS FOR AN OPTICAL PICKUP APPARATUS AND THE OPTICAL PICKUP APPARATUS

(75) Inventors: Kohei Ota, Hachioji (JP); Kentarou Nakamura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1107 days.

(21) Appl. No.: 11/716,628

(22) Filed: Mar. 12, 2007

(65) Prior Publication Data

US 2007/0217316 A1    Sep. 20, 2007

(30) Foreign Application Priority Data

Mar. 15, 2006  (JP) ................................. 2006-070701

(51) Int. Cl.
*G11B 7/00* (2006.01)
(52) U.S. Cl. .................... 369/112.23; 369/121
(58) Field of Classification Search .......................... None
See application file for complete search history.

(56) References Cited

U.S. PATENT DOCUMENTS

| | | | |
|---|---|---|---|
| 2004/0047269 A1* | 3/2004 | Ikenaka et al. | 369/112.08 |
| 2005/0068881 A1* | 3/2005 | Kimura et al. | 369/112.23 |
| 2005/0083562 A1* | 4/2005 | Hendriks | 359/205 |
| 2005/0207315 A1* | 9/2005 | Nomura et al. | 369/112.13 |
| 2005/0237898 A1* | 10/2005 | Kimura | 369/112.05 |
| 2006/0018214 A1* | 1/2006 | Fujii et al. | 369/44.37 |
| 2007/0177481 A1* | 8/2007 | Kimura et al. | 369/112.01 |

FOREIGN PATENT DOCUMENTS

| | | |
|---|---|---|
| JP | 2003-233928 | 8/2003 |
| JP | 2004-247025 | 9/2004 |

OTHER PUBLICATIONS

Notification of Office Action from the Patent Office of the People's Republic of China, mailed Aug. 3, 2010, in Chinese Patent Application No. 2007-80008191.4.
Abstract of JP 2003-233928 (Victor Co of Japan Ltd).
Abstract of JP 2004-247025 (Konica Minolta Holdings Inc.).

* cited by examiner

*Primary Examiner* — Paul Huber
(74) *Attorney, Agent, or Firm* — Finnegan, Henderson, Farabow, Garrett & Dunner, L.L.P.

(57) ABSTRACT

A method of manufacturing an optical pickup apparatus, comprising steps of selecting one type objective lens from plural types of objective lenses different in specification of respective optical path difference providing structures in accordance with an oscillation wavelength of a laser light source; and assembling the selected type objective lens and the laser light source into the apparatus.

18 Claims, 3 Drawing Sheets

MANUFACTURING METHOD OF AN OBJECTIVE LENS FOR AN OPTICAL PICKUP APPARATUS AND THE OPTICAL PICKUP APPARATUS

CROSS-REFERENCE TO RELATED APPLICATION

This application Japanese Patent Application No. 2006-070701 filed on Mar. 15, 2006, in Japanese Patent Office, the entire content of which is hereby incorporated by reference.

BACKGROUND OF THE INVENTION

The present invention relates to a manufacturing method of an objective lens for an optical pickup apparatus and the optical pickup apparatus, and particularly, to the manufacturing method of the objective lens for the optical pickup apparatus, and the optical pickup apparatus which has the good temperature characteristic.

Recently, a research and development of the high density optical system by which the recording and/or reproducing (hereinafter, "recording and/or reproducing" is written as "recording/reproducing") of the information can be conducted, by using the blue violet semiconductor laser of the wavelength of about 400 nm, is quickly advanced. As an example, in an optical disk by which the information recording/reproducing is conducted by a specification of NA 0.85, light source wavelength 405 nm, so called Blue-ray Disk (hereinafter, BD is used), to the optical disk of the diameter 12 cm whose size is the same as DVD (NA 0.6, light source wavelength 650 nm, the recording capacity is 4.75 GB), the information of 23-27 GB per 1 layer can be recorded, further, in an optical disk by which the information recording/reproducing is conducted by a specification of NA 0.65, light source wavelength 405 nm, so called HD DVD (hereinafter, called HD), to the optical disk of the diameter 12 cm, the information of 15-20 GB per 1 layer can be recorded. Hereinafter, in the present specification, such an optical disk is called as "high density optical disk".

Hereupon, as a performance required for the objective lens for the optical pickup apparatus, there are the "temperature characteristic" and "wavelength characteristic". The temperature characteristic is expressed by a change amount of the spherical aberration to the change of the environmental temperature, and the wavelength characteristic is expressed by a change amount of the spherical aberration to the oscillation wavelength change of the semiconductor laser, and as small as an extent of values of the both is, it is preferable as the objective lens for the optical pickup apparatus. However, for the time of the recording/reproducing of the information to the high density optical disk, the compatibility of the temperature characteristic and the wavelength characteristic due to the deviation of the oscillation wavelength of the blue violet semiconductor laser is difficult.

To such a problem, in Tokkai (Japanese Unexamined Patent Publication) No. 2002-82280, the light source, and the light-converging optical system including the objective lens for light-converging the light flux emitted from the light source through the transparent substrate of the optical information recording medium on the information recording surface, and the optical pickup apparatus having the optical detector for light-receiving the reflected light from the optical information recording medium, the optical pickup apparatus characterized in that a means for correcting a fine variation of the oscillation wavelength of the light source and a variation of the spherical aberration generated in the light-converging optical system due to the temperature and the humidity change is provided, is disclosed.

However, in Tokkai No. 2002-82280, as the correcting means for correcting the variation of the spherical aberration, a beam expander of 2-lens composition by which the lens interval can be changed, is shown. By using this engineering, in order to correspond to the fluctuation of the oscillation wavelength, it is necessary to control the correcting means corresponding to the fluctuation of the oscillation wavelength among respective semiconductor lasers (individual difference of semiconductor laser), for example, it is necessary to provide a setting means for setting a lens position as the initial position after adjusting the lens position of the beam expander being a correction means for each oscillation wavelength of a semiconductor laser to be incorporated in an optical pickup apparatu, there is a problem that the structure or assembly of the optical pickup apparatus becomes complex.

On the one hand, in Tokkai No. 2004-177527, when a correction element having a fine step structure is arranged before the glass made objective lens, an engineering by which the spherical aberration of the optical system to the wavelength change of the light source is corrected, is shown. However, when the glass made objective lens is replaced with a plastic made objective lens for the purpose of the weight reduction or others, a new problem is generated. That is, because a general plastic has a large temperature dependency of the refractive index, the spherical aberration change due to the temperature change is apt to become large. As a means for reducing this, a fine step difference structure is provided, a means for suppressing the spherical aberration change by using the change of the oscillation wavelength of the semiconductor laser following the temperature change is well known, however, when the spherical aberration change due to the wavelength change is given so that the spherical aberration change following the temperature change is cancelled, there is a problem that the spherical aberration change due to the wavelength change so as to correct the fluctuation of the oscillation wavelength of respective semiconductor lasers can not be given and it is difficult to counter the deviation of an oscillation wavelength due to individual difference of semiconductor lasers.

SUMMARY OF THE INVENTION

In view of such a conventional engineering problem, the present invention is attained, and the object of the present invention is to provide a manufacturing method of an optical pickup apparatus by which the recording/reproducing of the information can be conducted on the optical information recording medium irrespective of the temperature change and the fluctuation of the oscillation wavelength of respective semiconductor lasers, in particular, the fluctuation of the oscillation wavelength of the blue violet semiconductor laser. Further, the object of the present invention is to provide an optical pickup apparatus manufactured by the above manufacturing method, with the optical pickup apparatus, the recording/reproducing of the information can be conducted on the optical information recording medium irrespective of the temperature change and the fluctuation of the oscillation wavelength of respective semiconductor lasers.

A manufacturing method of the optical pickup apparatus written in item 1, is characterized in that the manufacturing method comprises steps of:

selecting one type objective lens from plural types of objective lenses different in specification of respective optical path difference providing structures in accordance with an oscillation wavelength of a laser light source; and assembling the selected type objective lens and the laser light source into the apparatus.

A manufacturing method of the optical pickup apparatus written in item 2, is characterized in that the manufacturing method comprises steps of:

preparing plural types of objective lenses different in specification of respective optical path difference providing structures;

selecting one type objective lens from the plural types of objective lenses in accordance with an oscillation wavelength of a laser light source; and assembling the selected type objective lens and the laser light source into the apparatus.

A manufacturing method of the optical pickup apparatus written in item 3, is characterized in that the manufacturing method comprises steps of:

selecting one light source from plural laser light sources different in oscillation wavelength in accordance with a specification of an optical path difference providing structure of an objective lens; and assembling the objective lens and the selected laser source into the apparatus.

A manufacturing method of the optical pickup apparatus written in item 4, is characterized in that the manufacturing method comprises steps of:

preparing plural types of objective lenses different in specification of respective optical path difference providing structures;

selecting one light source from plural laser light sources different in oscillation wavelength in accordance with a specification of an objective lens selected from the plural types of objective lenses; and assembling the selected objective lens and the selected laser source into the apparatus.

The manufacturing method of the optical pickup apparatus written in item 5, in any one of items 1 to 4, is characterized in that the light source is a light source having an oscillation wavelength of 500 nm or less.

The manufacturing method of the optical pickup apparatus written in item 6, in any one of items 1 to 5, is characterized in that the objective lens is made of a plastic, is provided with an optical path difference providing structure on at least one surface thereof and satisfies the following expression:

$$0.01 \leq |\delta SA3_{obj}/\delta \lambda| < 0.1 \ (\lambda rms/nm) \quad (1)$$

where $\delta SA3_{obj}/\delta \lambda$ represents the wavelength dependency of the 3rd order spherical aberration of the objective lens when the oscillation wavelength is fluctuated between ±2 nm from a reference wavelength of 500 nm or less.

A method of manufacturing an optical pickup apparatus written in item 7, is characterized in that the manufacturing method comprises steps of:

classifying plural objective lenses which are made of a plastic, have respective optical path difference providing structures on at least one surface and satisfy the following expression, into plural types in accordance with the specification of the respective optical path difference providing structures;

selecting one type objective lens from the plural types in accordance with an oscillation characteristic of a laser light source to be used; and assembling the laser source and the selected type objective, $$0.01 \leq |\delta SA3_{obj}/\delta \lambda| < 0.1 \ (\lambda rms/nm) \quad (1)$$

where $\delta SA3_{obj}/\delta \lambda$ represents the wavelength dependency of the 3rd order spherical aberration of the objective lens for the oscillation wavelength of 500 nm or less.

Because particularly, in plastic, the refractive index change is large, generally, the plastic made objective lens is said that the temperature characteristic is deteriorated. Accordingly, in the present invention, so that the temperature characteristic can be improved although it is formed of plastic, the objective lens for which the optical path difference providing structure is designed is manufactured. As the result of that, in the objective lens, the wavelength characteristic is deteriorated in the manner as to satisfy the expression (1). For the fluctuation of the oscillation wavelength of the light source, when the light source whose oscillation wavelength is close to the reference wavelength is selected, it can be said that it can be suppressed by some degree. However, in the current semiconductor laser, a deviation of an oscillation wavelength has been confirmed, therefore, if selecting and using a laser having a wavelength close to the reference wavelength, the cost becomes high.

Then, in the present invention, the objective lens whose specification of the optical path difference providing structure is changed is prepared by dividing into a plurality of groups such as, for example, a group of the objective lens having the optical path difference providing structure adequate for the laser light source whose oscillation wavelength is shifted to the plus side to the reference wavelength, a group of the objective lens having the optical path difference providing structure adequate for the laser light source whose oscillation wavelength is close to the reference wavelength, a group of the objective lens having the optical path difference providing structure adequate for the laser light source whose oscillation wavelength is shifted to the minus side to the reference wavelength, when the oscillation wavelength of the laser light source to be used is measured, and the objective lens is selected from the group optimum for that and combined, even when the temperature change is generated, the optical pickup apparatus by which the recording and/or reproducing of the information is adequately conducted, can be provided.

Here, it may be preferable to correct a high order spherical aberration of an objective lens (in particular, a spherical aberration of $5^{th}$ order or more) for an oscillation wavelength of 500 nm or less, especially a $5^{th}$ order spherical aberration very well, because an initial setting at the time of assembling a converging optical system in an optical pickup apparatus may be omitted or simplified.

Hereupon, "the specification of the optical path difference providing structure is different" means that a designed wavelength for an optical path difference providing structure is made different. For example, there may be a case that the designed wavelength of the diffractive structure is made different, however, it is not limited to that. Further, "the oscillation characteristic of the laser light source" means an actual working wavelength of respective laser sources (measured values of oscillation wavelength of respective laser light sources). Although the oscillation wavelength of respective laser light sources may usually cause dispersion for a reference wavelength being an original designed value of a laser light source due to a manufacturing error, it means the dispersed actual working wavelength of respective laser sources due to such a manufacturing error.

The manufacturing method of the optical pickup apparatus written in item 8, in the manufacturing method of the optical pickup apparatus written in item 7, is characterized in that when a delivery lot of the manufactured optical pickup apparatus is inspected, the following expression is satisfied.

$$\sigma_{SA3} \leq \sigma_\lambda \cdot \delta SA3/\delta \lambda \quad (2)$$

where, $\sigma_{SA3}$ (λrms) represents the standard deviation of the 3rd order spherical aberration SA3 of the light-converging optical system (from the light source to the information recording surface) including the objective lens of the optical pickup apparatus for the wavelength when the laser light source is oscillated at the reference temperature with the reference power in respective optical pickup apparatus, in the delivery lot of the optical pickup apparatus, $\sigma_\lambda$ (nm) represents the standard deviation of the oscillation wavelength at the reference temperature with the reference laser power included in the delivery lot of the optical pickup apparatus, and $\delta SA3/\delta\lambda$ (λrms/nm) represents the wavelength dependency of the 3rd order spherical aberration of the light-converging optical system (from the light source to the information recording surface) including the objective lens included in the delivery lot of the optical pickup apparatus.

The manufacturing method of the optical pickup apparatus written in item 9, in the manufacturing method of the optical pickup apparatus written in any one of items 6 to 8, is characterized in that the objective lenses are provided with respective identification marks for each different type. With this, for example, when a laser light source having a specific wavelength and a specific type objective lens are combined, a false combination can be suppressed.

The manufacturing method of the optical pickup apparatus written in item 10, in the manufacturing method of the optical pickup apparatus written in any one of items 6 to 9, is characterized in that the objective lenses satisfy the following expression.

$$0.02 \leq |\delta SA3_{obj}/\delta\lambda| < 0.1 \text{ (λrms/nm)} \quad (3)$$

The manufacturing method of the optical pickup apparatus written in item 11, in the manufacturing method of the optical pickup apparatus written in any one of items 6 to 10, is characterized in that the objective lenses satisfy the following expression:

$$|SA3_{obj}| \leq 0.030 \text{ (λrms)} \quad (4)$$

where $SA3_{obj}$ represents the 3rd order spherical aberration of the objective lens for the oscillation wavelength when a laser light source incorporated in the optical pickup apparatus oscillates with a reference output under a reference temperature.

The manufacturing method of the optical pickup apparatus written in item 12, in the manufacturing method of the optical pickup apparatus written in any one of items 6 to 11, is characterized in that the objective lenses satisfy the following expression:

$$|\delta SA3_{obj}/\delta T| < 0.002 \text{ (λrms/° C.)} \quad (5)$$

where $|\delta SA3_{obj}/\delta T|$ represents the temperature dependency of the 3rd order spherical aberration of the objective lens when an wavelength fluctuation for a temperature change in an oscillation wavelength of 500 nm or less is made +0.05 nm/° C.

Further, in the expression (5), an wavelength fluctuation for a temperature change (an wavelength change ration for a temperature change) is made +0.05 nm/° C. and the temperature dependency of the 3rd order spherical aberration of the objective lens is obtained. However, it can be measured on the assumption that the oscillation wavelength is not changed due to a temperature change. In this case, the above expression can be reworded with the following expression:

$$|\delta SA3_{obj}/\delta T| \leq 0.005 \text{ (λrms/° C.)} \quad (6)$$

where $|\delta SA3_{obj}/\delta T|$ represents the temperature dependency of the 3rd order spherical aberration of the objective lens in an oscillation wavelength of 500 nm or less (at this time, an oscillation wavelength is not changed for a temperature change).

The manufacturing method of the optical pickup apparatus written in item 13, in the manufacturing method of the optical pickup apparatus written in any one of items 6 to 12, is characterized in that the optical pickup apparatus comprises a first light source having an oscillation wavelength λ1 of 500 nm or less and a second light source having an oscillation wavelength λ2 (λ1<λ2), and the objective lens converges a light flux from the first light source through a protective substrate having a thickness t1 onto an information recording surface of a first information recording medium so as to conduct recording and/or reproducing information and converges a light flux from the second light source through a protective substrate having a thickness t2 (t1<t2) onto an information recording surface of a second information recording medium so as to conduct recording and/or reproducing information, and wherein the objective lens is made of a plastic and includes a diffractive structure on at least one surface in which a diffraction order having the maximum diffraction efficiency is different between a case that a light flux from the first light source passes through and a case that a light flux from the second light source passes through.

The manufacturing method of the optical pickup apparatus written in item 14, in the manufacturing method of the optical pickup apparatus written in any one of items 1 to 13, is characterized in that the objective lenses have an image side maximum numerical aperture of 0.8 or more.

Here, the term "image side" means an optical information recording medium side. In an objective lens used for recording and/or reproducing information for plural types of optical information recording mediums, when image side numerical apertures are different depending on the plural types of optical information recording mediums, the term "the largest numerical aperture" means the largest numerical aperture among the image side numerical apertures.

The manufacturing method of the optical pickup apparatus written in item 15, in the manufacturing method of the optical pickup apparatus written in any one of items 1 to 14, is characterized in that the objective lenses are structured with a single lens.

As an objective lens used in the above mentioned manufacturing method, an objective lens structured with plural components including plural lenses or optical elements may be employed, for example, needless to say, it may be an objective lens structured with two plastic lenses. However, by using a single objective made of a plastic as the objective lens, it may be preferable in a point that a low cost and simple optical pickup apparatus can be provided.

An optical pickup apparatus written in Item 16 is characterized in that the optical pickup apparatus is an optical pickup apparatus manufactured by the manufacturing method of the optical pickup apparatus written in any one of items 1 to 15.

In the present specification, the objective lens indicates a lens having the light-converging action in the condition in which the optical information recording medium is loaded into the optical pickup apparatus, in the position of the most optical information recording medium side, arranged to face this, and fitted to the actuator for driving the lens and when it is the optical element having the light-converging action which is integrally driven together with the lens or it has the lens, those optical element or the optical element group including the lens. That is, the objective lens is preferably a single lens, however, may also be a plurality of optical elements including at least one lens.

In the present specification, a preferable wavelength of a light source having a wavelength of 500 nm or less or a light source having an oscillation wavelength of 500 nm or less is 380 nm or higher and 420 nm or lower. Further, the oscillation wavelength is more preferable within a range of 400 nm to 415 nm. For example, when blue violet laser is used, it is expected as 400 nm to 415 nm.

In the present specification, "oscillation wavelength" mainly represents a wavelength when a laser light source is oscillated with a reference output under a reference temperature. With regard to a slight change of the oscillation wavelength and a change of the oscillation wavelength due to temperature change, a wavelength changed from the wavelength when a laser light source is oscillated with a reference output under a reference temperature is definitely called as the wavelength at the time.

Further, In the present specification, when measuring the value of $|\delta SA3_{obj}/\delta\lambda|$, it is measured under temperature is made constant. As a temperature at the measuring time, it may be preferable to measure under a constant temperature between 10° C. to 40° C. Further, the oscillation wavelength of a generally usable semiconductor laser is 405 nm or 407 nm as a reference wavelength in many cases. Accordingly, the 3rd order spherical aberration of an objective lens is measured under a constant temperature by using a wavelength of 403 nm fluctuated by −2 nm for 405 nm as an example of a reference wavelength and by using a wavelength of 407 nm fluctuated by +2 nm and the measurement values is divided by the fluctuation amount of ±2 nm (total 4 nm), thereby obtaining the value of $|\delta SA3_{obj}/\delta\lambda|$.

In the present specification, it may be preferable to design the optical path difference providing structure so as to increase the temperature characteristics of a plastic lens. Because particularly, in plastic, the refractive index change is large, generally, the plastic made objective lens is said that the temperature characteristic tends to deteriorate. Then, in the present invention, in order to improve the temperature characteristic even though it is made of plastic, it is preferable to use an objective lens having an optical path difference providing structure on at least one surface thereof. With this, when a plastic is used for an objective lens, by selecting a light source having an oscillation wavelength closer to the reference wavelength, it becomes possible to provide an optical pickup apparatus which has no problem in the wavelength characteristic and is simple at low cost. At this time, an objective lens made of a plastic may be an objective lens structure with a single lens, or may be an objective lens structure with plural components including plural lenses or plural optical elements, for example, may be an objective lens structure with two lenses made of a plastic.

Herein, an objective lens is made an objective lens structured with a single lens made of a plastic and is provided with an optical path difference providing structure on at least one surface thereof, whereby it may be preferable at a point to provide an optical pickup apparatus being simple and low cost.

Incidentally, in the present specification, an optical path difference providing structure includes every structure to provide an optical path difference, for example, includes NPS, a diffractive structure, and a structure to divide wavefront. Several examples of this optical path difference providing structure are shown in FIGS. 4(a) to 4(d).

According to the present invention, the manufacturing method of the objective lens for the optical pickup apparatus by which irrespective of the temperature change, the recording and/or reproducing of the information can be conducted on the optical information recording medium, can be provided, and also an optical pickup apparatus manufactured by the above method can be provided.

DETAILED DESCRIPTION OF THE PREFERRED EMBODIMENT

Figure 1:
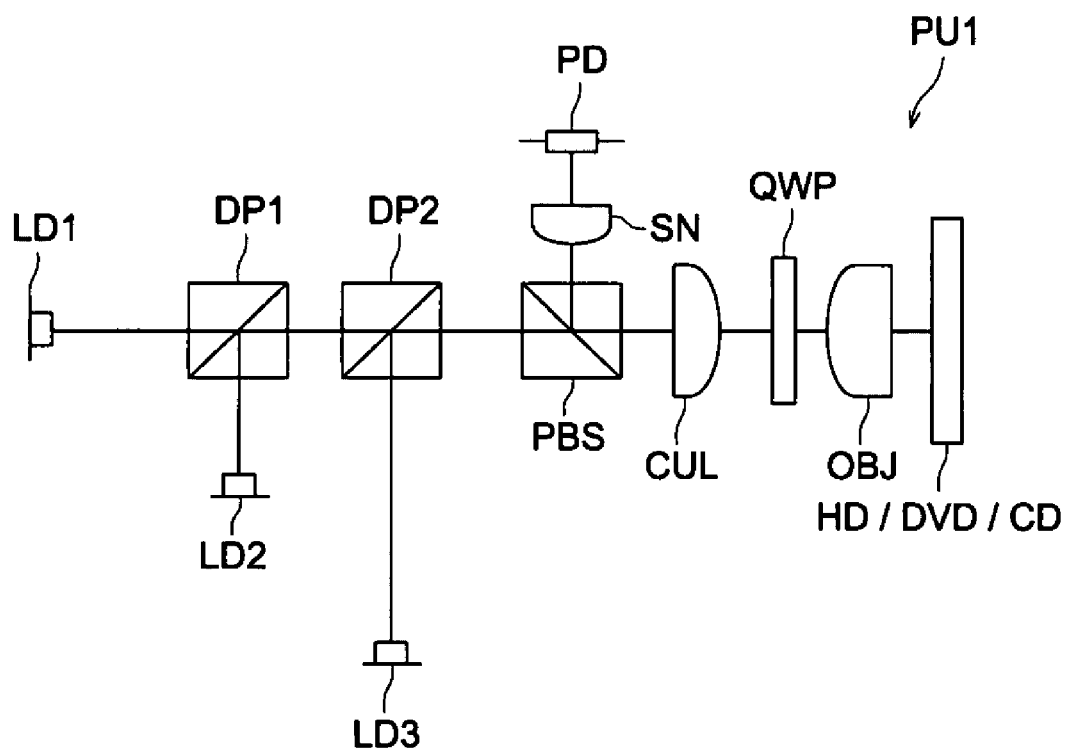
FIG. 1 is a view schematically showing the structure of the optical pickup apparatus of the present embodiment by which the recording/reproducing of the information can be adequately conducted on HD, DVD and CD which are different optical information recording media (called also optical disk).

Referring to the drawings, the embodiment of the present invention will be described below. FIG. 1 is a view generally showing the structure of the optical pickup apparatus PU1 of the present embodiment by which, to HD, DVD, and CD which are different optical information recording media (also called optical disk), the recording and/or reproducing of the information can be adequately conducted. Such an optical pickup apparatus PU1 can be mounted in the optical information recording reproducing apparatus.

The optical pickup apparatus PU1 is structured by the first semiconductor laser (the first light source) LD1 which emits the blue violet laser light flux (the first light flux) of $\lambda 1=407$ nm light-emitted when the recording and/or reproducing of the information is conducted on HD which is the high density optical disk, the second semiconductor laser (the second light source) LD2 which emits the red laser light flux (the second light flux) of $\lambda 2=655$ nm light-emitted when the recording and/or reproducing of the information is conducted on DVD, third semiconductor laser (the first light source) LD3 which emits the infrared laser light flux (the third light flux) of $\lambda 3=785$ nm light-emitted when the recording and/or reproducing of the information is conducted on CD, the photo detector PD for HD/DVD/CD common use, coupling lens CUL, the objective lens OBJ which has the function for light-converging the incident laser light flux on the information recording surface, and in conjunction with that it has a predetermined diffractive structure, it is made of plastic and a single lens, the polarized beam splitter PBS, the first dichroic prism DP1, the second dichroic prism DP2, λ/4 wavelength plate QWP, the sensor lens SN for adding the astigmatism to the reflected light flux of the optical disk. Hereupon, as the light source for HD, the blue violet SHG laser can also be used other than the above semiconductor laser LD1.

In the optical pickup apparatus PU1, when the recording/reproducing of the information is conducted on HD, the first semiconductor laser LD1 is light-emitted. The divergent light flux emitted from the first semiconductor laser LD1 is converted into the parallel light flux by the coupling lens CUL after passing the first dichroic prism DP1, the second dichroic prism DP2, the polarized beam splitter PBS, then passes λ/4 wavelength plate QWP, is regulated its light flux diameter by a diaphragm not shown, and becomes a spot formed on the information recording surface through the protective layer of HD by the objective lens OBJ. The objective lens OBJ conducts the focusing or tracking by 2-axis actuator (not shown) arranged in the periphery of that.

The reflected light flux modulated by the information pit on the information recording surface of HD, after transmits again the objective lens OBJ and λ/4 wavelength plate QWP and the coupling lens CUL, reflected by the polarized beam splitter PBS, astigmatism is added by the sensor lens SN, and is converged on the light-receiving surface of the photo detector PD. Then, by using the output signal of the photo detector PD, the information recorded in HD can be read.

In the optical pickup apparatus PU1, when the recording/reproducing of the information is conducted on DVD, the second semiconductor laser LD2 is light-emitted. The divergent light flux emitted from the second semiconductor laser LD2 is converted into the parallel light flux by the coupling lens CUL after reflecting by the first dichroic prism DP1 and passing the second dichroic prism DP2 and the polarized beam splitter PBS, then passes λ/4 wavelength plate QWP, is regulated its light flux diameter by a diaphragm not shown, and becomes a spot formed on the information recording surface through the protective layer of DVD by the objective lens OBJ. The objective lens OBJ conducts the focusing or tracking by 2-axis actuator (not shown) arranged in the periphery of that.

The reflected light flux modulated by the information pit on the information recording surface of DVD, after transmits again the objective lens OBJ and λ/4 wavelength plate QWP and the coupling lens CUL, reflected by the polarized beam splitter PBS, astigmatism is added by the sensor lens SN, and is converged on the light-receiving surface of the photo detector PD. Then, by using the output signal of the photo detector PD, the information recorded in DVD can be read.

In the optical pickup apparatus PU1, when the recording/reproducing of the information is conducted on CD, the third semiconductor laser LD3 is light-emitted. The divergent light flux emitted from the third semiconductor laser LD3 is converted into the parallel light flux by the coupling lens CUL after reflecting by the second dichroic prism DP2 and passing the polarized beam splitter PBS, then passes λ/4 wavelength plate QWP, is regulated its light flux diameter by a diaphragm not shown, and becomes a spot formed on the information recording surface through the protective layer of CD by the objective lens OBJ. The objective lens OBJ conducts the focusing or tracking by 2-axis actuator (not shown) arranged in the periphery of that.

The reflected light flux modulated by the information pit on the information recording surface of CD, after transmits again the objective lens OBJ and λ/4 wavelength plate QWP and the coupling lens CUL, reflected by the polarized beam splitter PBS, astigmatism is added by the sensor lens SN, and is converged on the light-receiving surface of the photo detector PD. Then, by using the output signal of the photo detector PD, the information recorded in CD can be read.

Hereupon, the semiconductor lasers LD1-LD3 are accommodated in one package, and may also structure so-called 3-laser 1 package. In such case, the dichroic prism becomes unnecessary.

Next, an example of the manufacturing method of the optical pickup apparatus according to the present embodiment will be described. Herein, it is considered that the objective optical element is optimized to the first semiconductor laser LD1 in which the deviation of the oscillation wavelength is larger. Initially, it is defined that the reference wavelength of the first semiconductor laser LD1 is 405 nm. The objective optical element in the first group is formed as follows. The objective optical element is designed, for the reference wavelength, so as to include an optical path difference providing structure by which the spherical aberration becomes optimum when the design wavelength is 402 nm. The first metallic mold corresponding to the objective optical element is produced, and the objective optical element molded by the first metallic mold is labeled as the first group.

The objective optical element in the second group is formed as follows. The objective optical element is designed so as to include an optical path difference providing structure by which the spherical aberration becomes optimum when the design wavelength is 403 nm. The second metallic mold corresponding to the objective optical element is produced, and the objective optical element molded by the second metallic mold is labeled as the second group.

The objective optical element in the third group is formed as follows. The objective optical element is designed so as to include an optical path difference providing structure by which the spherical aberration becomes optimum when the design wavelength is 404 nm. The third metallic mold corresponding to the objective optical element is produced, and the objective optical element molded by the third metallic mold is labeled as the third group.

The objective optical element in the fourth group is formed as follows. The objective optical element is designed so as to include an optical path difference providing structure by which the spherical aberration becomes optimum when the design wavelength is 405 nm. The fourth metallic mold corresponding to the objective optical element is produced, and the objective optical element molded by the fourth metallic mold is labeled as the fourth group.

The objective optical element in the fifth group is formed as follows. The objective optical element is designed so as to include an optical path difference providing structure by which the spherical aberration becomes optimum when the design wavelength is 406 nm. The fifth metallic mold corresponding to the objective optical element is produced, and the objective optical element molded by the fifth metallic mold is labeled as the fifth group.

The objective optical element in the sixth group is formed as follows. The objective optical element is designed so as to include an optical path difference providing structure by which the spherical aberration becomes optimum when the design wavelength is 407 nm. The sixth metallic mold corresponding to the objective optical element is produced, and the objective optical element molded by the sixth metallic mold is labeled as the sixth group.

The objective optical element in the seventh group is formed as follows. The objective optical element is designed so as to include an optical path difference providing structure by which the spherical aberration becomes optimum when the design wavelength is 408 nm. The seventh metallic mold corresponding to the objective optical element is produced, and the objective optical element molded by the seventh metallic mold is labeled as the seventh group.

As described above, in the present embodiment, as an example that a specification of an optical path difference providing structure is different, there is exemplified a case that a design wavelength of a diffractive structure is made different. Further, In this embodiment, the specification of the optical path difference providing structure is divided into seven groups. However it is to be understood that various changes and modifications will be apparent to those skilled in the art. For example, the numbers of groups may be 3 or 5.

Further, as the different design wavelength, the design wavelength is made different by a unit of 1 nm. However, it is not limited to this example, it may be properly changeable such that for example, objective lenses may be prepared by differing the design wavelength by a unit of 2 nm. Especially, in the case of an objective lens which has a large image side numerical aperture of 0.8 or more and is used for recording/reproducing information for BD, it may be preferable to prepare plural kinds of objective lenses by differing the design wavelength for an optical path difference providing structure such as a diffractive structure by a unit of 1 nm as shown in the present embodiment.

Further, the present embodiment shows as an example an objective lens structured with a single lens made of a plastic for use in an optical pickup apparatus for conducting recording/reproducing information appropriately for HD, DVD and CD. However, of course, the present embodiment is not limited to the above example. For example, it may be an objective lens structured with a single lens made of a plastic for use in an optical pickup apparatus for conducting recording/reproducing information appropriately for BD, DVD and CD. In addition, it may be an objective lens for use in an optical pickup apparatus for conducting recording/reproducing information appropriately for BD and DVD, or for use in an optical pickup apparatus for conducting recording/reproducing information appropriately for only BD or HD.

Still further, the present embodiment shows as a preferable example to attain effects more an objective lens structured with a single lens made of a plastic. However, the present embodiment is not limited to the above example. For example, the present invention may be applicable to an objective lens structured with two lenses made respectively of a plastic.

Figure 2:
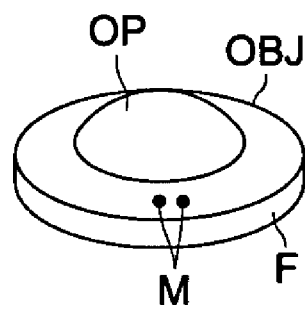
FIG. 2 is a perspective view of the molded objective lens OBJ.

FIG. 2 is a perspective view of the molded objective lens OBJ. As shown in FIG. 2, a convex or concave identification mark M is formed on the circular flange F arranged around the optical surface OP in the objective optical element OBJ. The mark can be simultaneously transferred and formed on the objective optical element OBJ at the time of the molding of the objective optical element OBJ by previously forming concave portion or convex portion corresponding to the mark on the flange transfer surface of the metallic mold (not shown). In the present embodiment, when one identification mark M is formed, it shows that the objective lens belongs to the first group. When two identification marks M are formed, it shows that the objective lens belongs to the second group. When three identification marks M are formed, it shows that the objective lens belongs to the third group. The succeeding groups are identified by the same manner. Hereupon, a method of labeling the groups is not limited to the above method. For example, the different identification mark may also be attached on that tray of an objective optical lens, cartridge or box for packaging that.

Figure 3:
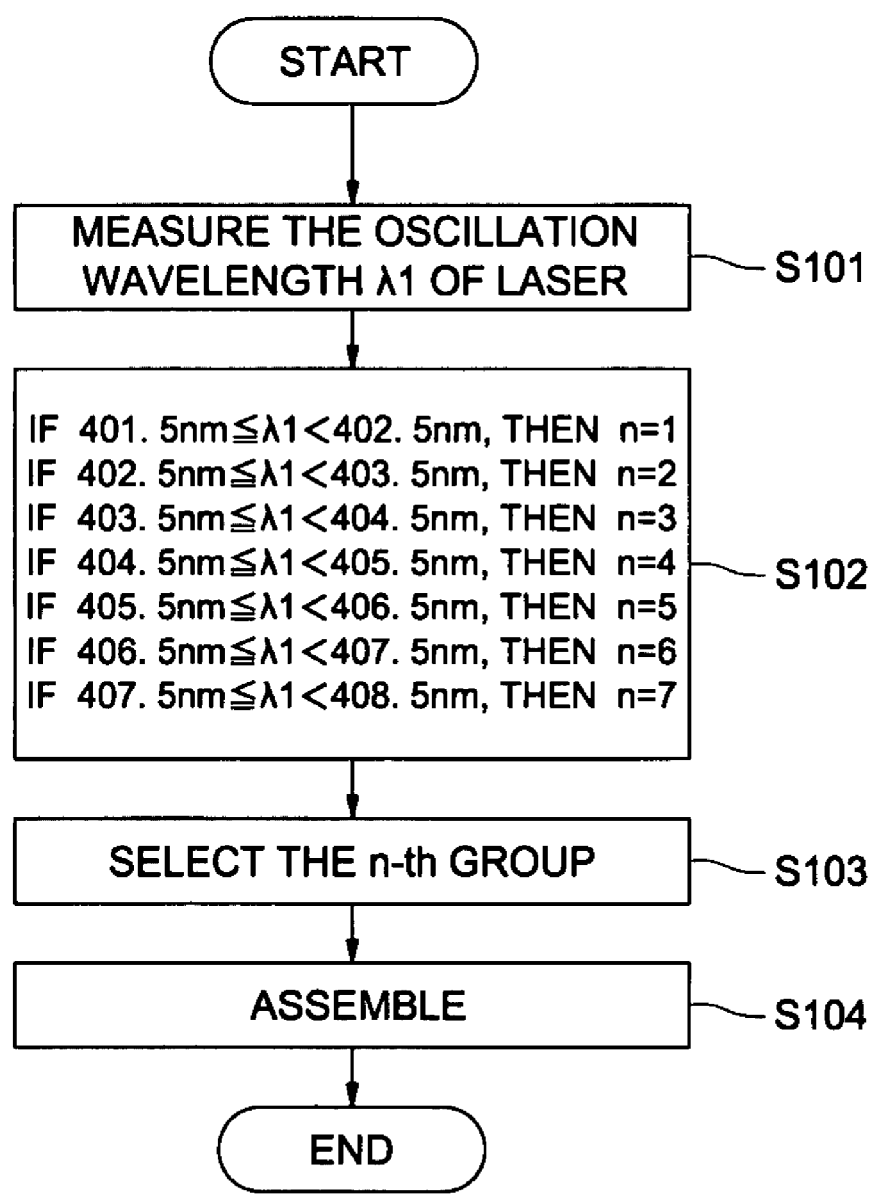
FIG. 3 is a flowchart showing the manufacturing method of the optical pickup apparatus according to the present embodiment.
Figure 4A:
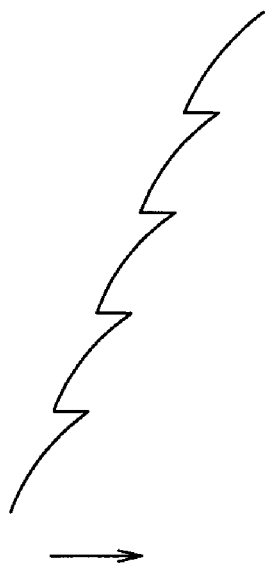
FIGS. 4(a)-4(d) are sectional views typically showing several examples of the optical path difference providing structure provided in objective optical element OBJ according to the present invention.
Figure 4B:
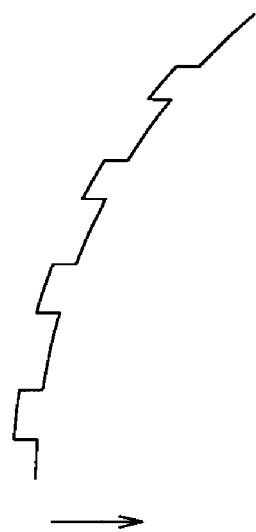
Figure 4C:
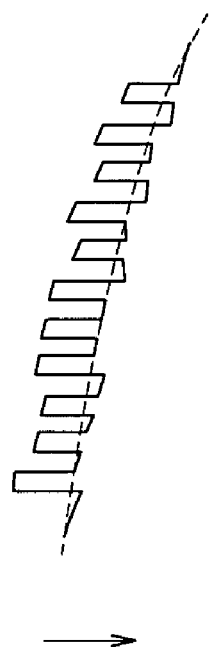
Figure 4D:
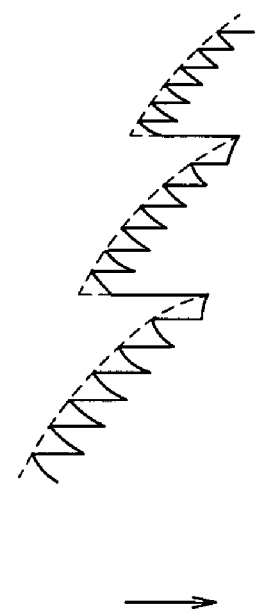

FIG. 3 is a flowchart showing the manufacturing method of the optical pickup apparatus according to the present embodiment. In step S101 of FIG. 16, the oscillation wavelength $\lambda 1$ of the arbitrary blue-violet semiconductor laser diode is measured. Next, in step S102, if the measured oscillation wavelength $\lambda 1$ is 401.5 nm or more, and less than 402.5 nm, n is set to 1; if the measured oscillation wavelength $\lambda 1$ is 402.5 nm or more, and less than 403.5 nm, n is set to 2; if the measured oscillation wavelength $\lambda 1$ is 403.5 nm or more, and less than 404.5 nm, n is set to 3; when the measured oscillation wavelength $\lambda 1$ is 404.5 nm or more, and less than 405.5 nm, n is set to 4; if the measured oscillation wavelength $\lambda 1$ is 405.5 nm or more, and less than 406.5 nm, n is set to 5; when the measured oscillation wavelength $\lambda 1$ is 406.5 nm or more, and less than 407.5 nm, n is set to 6; and if the measured oscillation wavelength $\lambda 1$ is 407.5 nm or more, and less than 408.5 nm, n is set to 7. Hereupon, when the oscillation wavelength $\lambda 1$ of the first semiconductor laser is less than 401.5 nm, or is 408.5 nm or more, it may be replaced with another one as the product which is out of the tolerance.

In succeeding step S103, the objective optical element in the n-th group is selected. Further, in step S104, when the measured blue-violet semiconductor laser diode and parts including the selected objective optical element are assembled, the optical pickup apparatus is completed.

According to the present embodiment, for example, as a result that the temperature characteristic is improved so that $|\delta SA3_{obj}/\delta T| \leq 0.002$ ($\lambda$rms/° C.) is satisfied, even in the objective lens whose wavelength characteristic is deteriorated in the degree in which $0.1 > |\delta SA3_{obj}/\delta \lambda| \geq 0.01$ ($\lambda$rms/nm) is satisfied, it is divided into groups for each diffractive structure of different specification, and because they are used in combination with the oscillation wavelength of the actual semiconductor laser, even when there is the fluctuation in the oscillation wavelength of the semiconductor laser, or the environmental temperature change is generated, the optical pickup apparatus by which the recording and/or reproducing of the information can be adequately conducted, can be provided.

Incidentally, the present embodiment shows an example that one kind is selected from plural kinds of previously prepared objective lenses differing in optical path difference providing structure in accordance with an oscillation property of a light source to be used, such as an actual oscillation wavelength of respective laser sources. However, it may also preferable that the oscillation properties of light sources are classified into plural groups in advance and a laser source having an adaptable oscillation property is selected in accordance with a kind of an objective lens.

Incidentally, when the delivery lot of the manufactured optical pickup apparatus is inspected, it may be preferable to satisfy the following conditional expression.

$$\sigma_{SA3} \leq \sigma_\lambda \cdot \delta SA3/\delta \lambda \qquad (2)$$

Where, $\sigma_{SA3}$ ($\lambda$rms) represents, in the delivery lot of the optical pickup apparatus, the standard deviation of the 3rd order spherical aberration SA3 of the light-converging optical system (from the light source to the information recording surface) including the objective lens of the optical pickup apparatus when, in respective optical pickup apparatus, the laser light source is oscillated at the reference temperature with the reference power, $\sigma_I$ (nm) represents, the standard deviation of the oscillation wavelength at the reference temperature with the reference laser power included in the delivery lot of the optical pickup apparatus, and $\delta SA3/\delta \lambda$ ($\lambda$rms/nm) represents, the wavelength dependency of the 3rd order spherical aberration of the light-converging optical system (from the light source to the information recording surface) including the objective lens included in the delivery lot of the optical pickup apparatus.

EXAMPLES

Examples appropriate for the above embodiment and the comparative example will be described below. Hereupon, hereinafter (lens data of the table is included), the exponent of 10 (for example, $2.5 \times 10^{-3}$) is expressed by using E (for example, 2.5 E-3).

The optical surface of the objective optical system is formed into the aspheric surface which is axial symmetry around the optical axis regulated by the equations in which into the expression [Math-1], coefficients shown in the Table are respectively substituted.

$$z=(y^2/\gamma)/[1+\sqrt{\{1-(k+1)(y/\gamma)^2\}}]+A_4y^4+A_6y^6+A_8y^8+A_{10}y^{10}A_{12}y^{12}+A_{14}y^{14}+A_{16}y^{16}A_{18}y^{18}+A_{20}y^{20}$$ [Math-1]

Where, z: aspheric surface shape (distance from the surface tangent to the surface top of the aspheric surface in the direction along the optical axis)
Y: distance from the optical axis, y: radius of curvature,
K: conic coefficient,
$A_4, A_6, A_8, A_{10}, A_{12}, A_{14}, A_{16}, A_{18}, A_{20}$: aspheric surface coefficient Further, the optical path difference given to the light flux of each wavelength by the diffractive structure (phase structure) is regulated by the equation in which coefficients shown in Table are substituted into the optical path difference function.

$$\Phi = dor \times \lambda/\lambda_B \times (B_2h^2+B_4h^4+B_6h^6+B_8h^8+B_{10}h^{10})$$ [Math-2]

Where, $\Phi$: optical path difference, $\lambda$: the wavelength of the light flux incident on the diffractive structure, $\lambda_B$: manufactured wavelength, dor: the diffraction order of the diffraction light used for the recording/reproducing to the optical disk, h: the distance from the optical axis, $B_2, B_4, B_6, B_8, B_{10}$: optical path difference function coefficients Example 1

The lens data of example 1 is shown in Table 1. In example 1, the designed wavelength is 405 nm. In this case, the wavelength characteristic: $|\delta SA3_{obj}/\delta\lambda|=0.00287$, the temperature characteristic: $|\delta SA3_{obj}/\delta T|=0.0014\lambda ms/°C$. Hereupon, the temperature characteristic is calculated under the following conditions.

The temperature change ratio of the refractive index: dn/dT=−0.00009 (/° C.)

The temperature change ratio of the oscillation wavelength of the laser: $d\lambda/dT=+0.05$ nm/° C.)

TABLE 1

Example of a single diffractive lens Lens data

| The focal distance of the objective lens | $f_1$ = 2.20 mm | $f_2$ = 2.28 mm | $f_3$ = 2.47 mm |
|---|---|---|---|
| Numerical aperture | NA1: 0.85 | NA2: 0.60 | NA3: 0.45 |
| Magnification | m1: 0 | m2: 0 | m3: 0 |

| i-th surface | ri | di(405 nm) | ni(405 nm) | di(658 nm) | ni(658 nm) | di(785 nm) | ni(785 nm) |
|---|---|---|---|---|---|---|---|
| 0 | | ∞ | | ∞ | | ∞ | |
| 1(stop diameter) | | 0.0 (φ3.74 mm) | | 0.0 (φ2.70 mm) | | 0.0 (φ2.28 mm) | |
| 2 | 1.5656 | 2.680 | 1.561 | 2.680 | 1.540 | 2.680 | 1.536 |
| 2-1 | 1.5626 | | | | | | |
| 2-2 | 1.5595 | | | | | | |
| 2-3 | 1.5570 | | | | | | |
| 2-4 | 1.5661 | | | | | | |
| 2-5 | 1.5633 | | | | | | |
| 2-6 | 1.5643 | | | | | | |
| 2-7 | 1.5657 | | | | | | |
| 2-8 | 1.5656 | | | | | | |
| 2-9 | 1.5302 | | | | | | |
| 3 | −2.8740 | 0.67 | | 0.43 | | 0.32 | |
| 4 | ∞ | 0.0875 | 1.620 | 0.600 | 1.577 | 1.200 | 1.571 |
| 5 | ∞ | | | | | | |

| | Surface no. | | | | | |
|---|---|---|---|---|---|---|
| | 2 | 2-1 | 2-2 | 2-3 | 2-4 | 2-5 |
| | | | Area | | | |
| | h ≤ 0.399 | 0.399 ≤ h ≤ 0.648 | 0.648 ≤ h ≤ 0.925 | 0.925 ≤ h ≤ 1.146 | 1.146 ≤ h ≤ 1.202 | 1.202 ≤ h ≤ 1.239 |
| *1 κ | −5.4576E−01 | −5.4415E−01 | −5.4355E−01 | −5.4037E−01 | −5.2374E−01 | −5.3468E−01 |
| A0 | 0.0000E+00 | 7.2315E−03 | 1.4464E−02 | 2.1747E−02 | 1.9351E−02 | 1.5092E−02 |
| A4 | 1.7346E−02 | 1.7346E−02 | 1.7346E−02 | 1.7346E−02 | 1.7346E−02 | 1.7348E−02 |
| A6 | 1.6127E−03 | 1.6127E−03 | 1.6127E−03 | 1.6127E−03 | 1.6127E−03 | 1.6127E−03 |
| A8 | 2.2727E−03 | 2.2727E−03 | 2.2727E−03 | 2.2727E−03 | 2.2727E−03 | 2.2727E−03 |
| A10 | −1.7621E−03 | −1.7621E−03 | −1.7621E−03 | −1.7621E−03 | −1.7621E−03 | −1.7621E−03 |
| A12 | 8.3267E−04 | 8.3267E−04 | 8.3267E−04 | 8.3267E−04 | 8.3267E−04 | 8.3267E−04 |
| A14 | 3.0625E−04 | 3.0625E−04 | 3.0625E−04 | 3.0625E−04 | 3.0625E−04 | 3.0625E−04 |
| A16 | −3.1251E−04 | −3.1251E−04 | −3.1251E−04 | −3.1251E−04 | −3.1251E−04 | −3.1251E−04 |
| A18 | 7.7920E−05 | 7.7920E−05 | 7.7920E−05 | 7.7920E−05 | 7.7920E−05 | 7.7920E−05 |
| A20 | −3.8218E−06 | −3.8218E−06 | −3.8218E−06 | −3.8218E−06 | −3.8218E−06 | −3.8218E−06 |
| *2 *3 | 2/1/1 | 2/1/1 | 2/1/1 | 2/1/1 | 2/1/1 | 2/1/1 |
| *4 | 395 nm | 395 nm | 395 nm | 395 nm | 395 nm | 395 nm |
| B2 | −7.9481E−03 | −7.9481E−03 | −7.9481E−03 | −7.9481E−03 | −7.9481E−03 | −7.9481E−03 |
| B4 | 3.1618E−03 | 3.1618E−03 | 3.1618E−03 | 3.1618E−03 | 3.1618E−03 | 3.1618E−03 |
| B6 | 2.6104E−04 | 2.6104E−04 | 2.6104E−04 | 2.6104E−04 | 2.6104E−04 | 2.6104E−04 |
| B8 | −1.5449E−04 | −1.5449E−04 | −1.5449E−04 | −1.5449E−04 | −1.5449E−04 | −1.5449E−04 |
| B10 | 1.3011E−04 | 1.3011E−04 | 1.3011E−04 | 1.3011E−04 | 1.3011E−04 | 1.3011E−04 |
| *2 *3 | 0/0/1 | 0/0/1 | 0/0/1 | 0/0/1 | | |
| *4 | 785 nm | 785 nm | 785 nm | 785 nm | | |
| B2 | 2.5740E−02 | 2.5740E−02 | 2.5740E−02 | 2.5740E−02 | | |
| B4 | −2.0546E−03 | −2.0546E−03 | −2.0546E−03 | −2.0546E−03 | | |

TABLE 1-continued

| | Example of a single diffractive lens Lens data | | | |
|---|---|---|---|---|
| B6 | 1.3676E-03 | 1.3676E-03 | 1.3676E-03 | 1.3676E-03 |
| B8 | -6.6372E-04 | -6.6372E-04 | -6.6372E-04 | -6.6372E-04 |
| B10 | 1.3799E-04 | 1.3799E-04 | 1.3799E-04 | 1.3799E-04 |

| | | Surface no. | | | |
|---|---|---|---|---|---|
| | | 2-6 | 2-7 | 2-8 | 2-9 | 3 |

| | | Area | | | |
|---|---|---|---|---|---|
| | | $1.239 \leq h \leq 1.292$ | $1.292 \leq h \leq 1.347$ | $1.347 \leq h \leq 1.375$ | $1.375 \leq h$ | |

| *1 | κ | -5.4074E-01 | -5.3663E-01 | -5.4576E-01 | -6.1555E-01 | -5.4022E+01 |
|---|---|---|---|---|---|---|
| | A0 | 1.1304E-02 | 7.8295E-03 | 1.5099E-05 | 3.3680E-02 | 0.0000E+00 |
| | A4 | 1.7572E-02 | 1.7277E-02 | 1.7346E-02 | 1.3114E-02 | 1.0541E-01 |
| | A6 | 1.6127E-03 | 1.6127E-03 | 1.6124E-03 | -1.7781E-03 | -1.0213E-01 |
| | A8 | 2.2727E-03 | 2.2727E-03 | 2.2727E-03 | 2.6257E-03 | 7.4675E-02 |
| | A10 | -1.7621E-03 | -1.7621E-03 | -1.7621E-03 | -1.5662E-03 | -4.3240E-02 |
| | A12 | 8.3267E-04 | 8.3267E-04 | 8.3267E-04 | 2.2850E-04 | 1.4629E-02 |
| | A14 | 3.0625E-04 | 3.0625E-04 | 3.0625E-04 | 2.3918E-04 | -2.0762E-03 |
| | A16 | -3.1251E-04 | -3.1251E-04 | -3.1251E-04 | -1.6603E-04 | 0.0000E+00 |
| | A18 | 7.7920E-05 | 7.7920E-05 | 7.7920E-05 | 4.5156E-05 | 0.0000E+00 |
| | A20 | -3.8218E-06 | -3.8218E-06 | -3.8218E-06 | -4.7254E-06 | 0.0000E+00 |
| *2 | *3 | 2/1/1 | 2/1/1 | 2/1/1 | 5/3/2 | |
| | *4 | 395 nm | 395 nm | 395 nm | 405 nm | |
| | B2 | -7.9481E-03 | -7.9481E-03 | -7.9481E-03 | -1.0012E-03 | |
| | B4 | 3.1618E-03 | 3.1618E-03 | 3.1618E-03 | -1.0849E-04 | |
| | B6 | 2.6104E-04 | 2.6104E-04 | 2.6104E-04 | 1.2384E-05 | |
| | B8 | -1.5449E-04 | -1.5449E-04 | -1.5449E-04 | -5.9681E-06 | |
| | B10 | 1.3011E-04 | 1.3011E-04 | 1.3011E-04 | -8.9463E-06 | |
| *2 | *3 | | | | | |
| | *4 | | | | | |
| | B2 | | | | | |
| | B4 | | | | | |
| | B6 | | | | | |
| | B8 | | | | | |
| | B10 | | | | | |

*1: Aspheric surface coefficient,
*2: Optical path difference function
*3: Diffraction order,
*4: Manufactured wavelength, The lens data of example 2 is shown in Table 2. In example 2, the designed wavelength is 408 nm. In this case, the wavelength characteristic: $|\delta SA3_{obj}/\delta\lambda|=0.0262$ λms/° C., the temperature characteristic: $|\delta SA3_{obj}/\delta T|=0.0017$ λms/° C. Hereupon, the temperature characteristic is calculated under the following conditions.

The temperature change ratio of the refractive index: $dn/dT=-0.00009$ (/° C.)

The temperature change ratio of the oscillation wavelength of the laser: $d\lambda/dT=+0.05$ (nm/° C.)

TABLE 2

| Example of a single diffractive lens Lens data | | | | | | |
|---|---|---|---|---|---|---|
| The focal distance of the objective lens | | $f_1 = 2.20$ mm | | $f_2 = 2.28$ mm | | $f_3 = 2.47$ mm |
| Numerical aperture | | NA1: 0.85 | | NA2: 0.60 | | NA3: 0.45 |
| Magnification | | m1: 0 | | m2: 0 | | m3: 0 |

| i-th surface | ri | di(408 nm) | ni(408 nm) | di(658 nm) | ni(658 nm) | di(785 nm) | ni(785 nm) |
|---|---|---|---|---|---|---|---|
| 0 | | ∞ | | ∞ | | ∞ | |
| 1(stop diameter) | | 0.0 (φ3.74 mm) | | 0.0 (φ2.70 mm) | | 0.0 (φ2.28 mm) | |
| 2 | 1.5694 | 2.680 | 1.560 | 2.680 | 1.540 | 2.680 | 1.536 |
| 2-1 | 1.5663 | | | | | | |
| 2-2 | 1.5663 | | | | | | |
| 2-3 | 1.5609 | | | | | | |
| 2-4 | 1.5699 | | | | | | |
| 2-5 | 1.5671 | | | | | | |
| 2-6 | 1.5681 | | | | | | |
| 2-7 | 1.5682 | | | | | | |
| 2-8 | 1.5694 | | | | | | |
| 2-9 | 1.5348 | | | | | | |

TABLE 2-continued

Example of a single diffractive lens Lens data

| | | | | | | | |
|---|---|---|---|---|---|---|---|
| 3 | −2.8762 | 0.67 | | 0.43 | | 0.32 | |
| 4 | ∞ | 0.0875 | 1.620 | 0.600 | 1.577 | 1.200 | 1.571 |
| 5 | ∞ | | | | | | |

| | | Surface no. | | | | | |
|---|---|---|---|---|---|---|---|
| | | 2 | 2-1 | 2-2 | 2-3 | 2-4 | 2-5 |
| | | | | | Area | | |
| | | h ≦ 0.391 | 0.391 ≦ h ≦ 0.630 | 0.630 ≦ h ≦ 0.959 | 0.959 ≦ h ≦ 1.143 | 1.143 ≦ h ≦ 1.204 | 1.204 ≦ h ≦ 1.242 |
| *1 | κ | −5.4624E−01 | −5.4471E−01 | −5.4378E−01 | −5.4017E−01 | −5.2379E−01 | −5.3490E−01 |
| | A0 | 0.0000E+00 | 7.2910E−03 | 1.4585E−02 | 2.1950E−02 | 1.9527E−02 | 1.5219E−02 |
| | A4 | 1.7201E−02 | 1.7201E−02 | 1.7201E−02 | 1.7201E−02 | 1.7201E−02 | 1.7201E−02 |
| | A6 | 1.8097E−03 | 1.8097E−03 | 1.8097E−03 | 1.8097E−03 | 1.8097E−03 | 1.8097E−03 |
| | A8 | 2.3632E−03 | 2.3632E−03 | 2.3632E−03 | 2.3632E−03 | 2.3632E−03 | 2.3632E−03 |
| | A10 | −1.7812E−03 | −1.7812E−03 | −1.7812E−03 | −1.7812E−03 | −1.7812E−03 | −1.7812E−03 |
| | A12 | 8.2964E−04 | 8.2964E−04 | 8.2964E−04 | 8.2964E−04 | 8.2964E−04 | 8.2964E−04 |
| | A14 | 3.0355E−04 | 3.0355E−04 | 3.0355E−04 | 3.0355E−04 | 3.0355E−04 | 3.0355E−04 |
| | A16 | −3.1251E−04 | −3.1251E−04 | −3.1251E−04 | −3.1251E−04 | −3.1251E−04 | −3.1251E−04 |
| | A18 | 7.7920E−05 | 7.7920E−05 | 7.7920E−05 | 7.7920E−05 | 7.7920E−05 | 7.7920E−05 |
| | A20 | −3.8218E−06 | −3.8218E−06 | −3.8218E−06 | −3.8218E−06 | −3.8218E−06 | −3.8218E−06 |
| *2 | *3 | 2/1/1 | 2/1/1 | 2/1/1 | 2/1/1 | 2/1/1 | 2/1/1 |
| | *4 | 395 nm | 395 nm | 395 nm | 395 nm | 395 nm | 395 nm |
| | B2 | −8.2270E−03 | −8.2270E−03 | −8.2270E−03 | −8.2270E−03 | −8.2270E−03 | −8.2270E−03 |
| | B4 | 3.0832E−03 | 3.0832E−03 | 3.0832E−03 | 3.0832E−03 | 3.0832E−03 | 3.0832E−03 |
| | B6 | 2.8727E−04 | 2.8727E−04 | 2.8727E−04 | 2.8727E−04 | 2.8727E−04 | 2.8727E−04 |
| | B8 | −1.0740E−04 | −1.0740E−04 | −1.0740E−04 | −1.0740E−04 | −1.0740E−04 | −1.0740E−04 |
| | B10 | 1.0978E−04 | 1.0978E−04 | 1.0978E−04 | 1.0978E−04 | 1.0978E−04 | 1.0978E−04 |
| *2 | *3 | 0/0/1 | 0/0/1 | 0/0/1 | 0/0/1 | | |
| | *4 | 785 nm | 785 nm | 785 nm | 785 nm | | |
| | B2 | 2.6340E−02 | 2.6340E−02 | 2.6340E−02 | 2.6340E−02 | | |
| | B4 | −2.6677E−03 | −2.6677E−03 | −2.6677E−03 | −2.6677E−03 | | |
| | B6 | 1.6435E−03 | 1.6435E−03 | 1.6435E−03 | 1.6435E−03 | | |
| | B8 | −6.8215E−04 | −6.8215E−04 | −6.8215E−04 | −6.8215E−04 | | |
| | B10 | 1.4751E−04 | 1.4751E−04 | 1.4751E−04 | 1.4751E−04 | | |

| | | Surface no. | | | | |
|---|---|---|---|---|---|---|
| | | 2-6 | 2-7 | 2-8 | 2-9 | 3 |
| | | | | Area | | |
| | | 1.242 ≦ h ≦ 1.295 | 1.295 ≦ h ≦ 1.334 | 1.334 ≦ h ≦ 1.366 | 1.366 ≦ h | |
| *1 | κ | −5.4119E−01 | −5.4066E−01 | −5.4608E−01 | −6.1344E−01 | −5.3862E+01 |
| | A0 | 1.1398E−02 | 7.5911E−03 | −8.2657E−06 | 3.4568E−02 | 0.0000E+00 |
| | A4 | 1.7430E−02 | 1.7201E−02 | 1.7202E−02 | 1.3171E−02 | 1.0638E−01 |
| | A6 | 1.8097E−03 | 1.8097E−03 | 1.8097E−03 | 8.3564E−05 | −1.0234E−01 |
| | A8 | 2.3632E−03 | 2.3632E−03 | 2.3632E−03 | 2.6329E−03 | 7.4415E−02 |
| | A10 | −1.7812E−03 | −1.7812E−03 | −1.7812E−03 | −1.5784E−03 | −4.3197E−02 |
| | A12 | 8.2964E−04 | 8.2964E−04 | 8.2964E−04 | 2.2753E−04 | 1.4707E−02 |
| | A14 | 3.0355E−04 | 3.0355E−04 | 3.0355E−04 | 2.4000E−04 | −2.1019E−03 |
| | A16 | −3.1251E−04 | −3.1251E−04 | −3.1251E−04 | −1.6598E−04 | 0.0000E+00 |
| | A18 | 7.7920E−05 | 7.7920E−05 | 7.7920E−05 | 4.5134E−05 | 0.0000E+00 |
| | A20 | −3.8218E−06 | −3.8218E−06 | −3.8218E−06 | −4.7256E−06 | 0.0000E+00 |
| *2 | *3 | 2/1/1 | 2/1/1 | 2/1/1 | 5/3/2 | |
| | *4 | 395 nm | 395 nm | 395 nm | 408 nm | |
| | B2 | −8.2270E−03 | −8.2270E−03 | −8.2270E−03 | −1.0932E−03 | |
| | B4 | 3.0832E−03 | 3.0832E−03 | 3.0832E−03 | −1.1209E−04 | |
| | B6 | 2.8727E−04 | 2.8727E−04 | 2.8727E−04 | 1.2296E−05 | |
| | B8 | −1.0740E−04 | −1.0740E−04 | −1.0740E−04 | −6.3141E−06 | |
| | B10 | 1.0978E−04 | 1.0978E−04 | 1.0978E−04 | −9.0622E−06 | |
| *2 | *3 | | | | | |
| | *4 | | | | | |
| | B2 | | | | | |
| | B4 | | | | | |
| | B6 | | | | | |
| | B8 | | | | | |
| | B10 | | | | | |

*1: Aspheric surface coefficient,
*2: Optical path difference function
*3: Diffraction order,
*4: Manufactured wavelength,

Comparative Example

The lens data of example 2 is shown in Table 3. In the comparative example, the designed wavelength is 405 nm. In this case, the wavelength characteristic: $|\delta SA3_{obj}/\delta\lambda|=0.0094$ λms/° C., the temperature characteristic: $|\delta SA3_{obj}/\delta T|=0.0053$ λms/° C. Hereupon, the temperature characteristic is calculated under the following conditions.

The temperature change ratio of the refractive index: $dn/dT=-0.00010$ (/° C.)

The temperature change ratio of the oscillation wavelength of the laser: $d\lambda/dT=+0.05$ (nm/° C.)

TABLE 3

| Example of a single diffractive lens Lens data | | | | | | |
|---|---|---|---|---|---|---|
| The focal distance of the objective lens | | $f_1$ = 2.20 mm | | $f_2$ = 2.28 mm | | $f_3$ = 2.42 mm |
| Numerical aperture | | NA1: 0.85 | | NA2: 0.60 | | NA3: 0.45 |
| Magnification | | m1: 0 | | m2: 0 | | m3: 0 |

| i-th surface | ri | di(405 nm) | ni(405 nm) | di(658 nm) | ni(658 nm) | di(785 nm) | ni(785 nm) |
|---|---|---|---|---|---|---|---|
| 0 | ∞ | | | | | | |
| 1(stop diameter) | | 0.0 (φ3.74 mm) | | 0.0 (φ2.68 mm) | | 0.0 (φ2.18 mm) | |
| 2 | 1.5795 | 2.430 | 1.605 | 2.430 | 1.586 | 2.430 | 1.582 |
| 2-1 | 1.5799 | | | | | | |
| 2-2 | 1.5804 | | | | | | |
| 2-3 | 1.5810 | | | | | | |
| 2-4 | 1.5793 | | | | | | |
| 2-5 | 1.5816 | | | | | | |
| 2-6 | 1.5374 | | | | | | |
| 3 | −4.7732 | 0.79 | | 0.54 | | 0.32 | |
| 4 | ∞ | 0.0875 | 1.620 | 0.600 | 1.577 | 1.200 | 1.571 |
| 5 | ∞ | | | | | | |

| | | Surface no. | | | |
|---|---|---|---|---|---|
| | | 2 | 2-1 | 2-2 | 2-3 |
| | | | Area | | |
| | | $h \leq 1.117$ | $1.117 \leq h \leq 1.178$ | $1.178 \leq h \leq 1.224$ | $1.224 \leq h \leq 1.262$ |
| Aspheric surface coefficient | κ | −5.1483E−01 | −5.1735E−01 | −5.1984E−01 | −5.2196E−01 |
| | A0 | 0.0000E+00 | −3.4971E−03 | −6.9971E−03 | −1.0502E−02 |
| | A4 | 1.2950E−02 | 1.2950E−02 | 1.2950E−02 | 1.2952E−02 |
| | A6 | 2.6726E−03 | 2.6726E−03 | 2.6726E−03 | 2.6726E−03 |
| | A8 | 3.8605E−03 | 3.8605E−03 | 3.8605E−03 | 3.8605E−03 |
| | A10 | −3.5626E−03 | −3.5626E−03 | −3.5626E−03 | −3.5626E−03 |
| | A12 | 1.3965E−03 | 1.3965E−03 | 1.3965E−03 | 1.3965E−03 |
| | A14 | 8.5125E−05 | 8.5125E−05 | 8.5125E−05 | 8.5125E−05 |
| | A16 | −1.6888E−04 | −1.6888E−04 | −1.6888E−04 | −1.6888E−04 |
| | A18 | 4.5316E−05 | 4.5316E−05 | 4.5316E−05 | 4.5316E−05 |
| | A20 | −4.4456E−06 | −4.4456E−06 | −4.4456E−06 | −4.4456E−06 |
| Optical path difference function | Diffraction order | 2/1/1 | 2/1/1 | 2/1/1 | 2/1/1 |
| | Manufactured wavelength | 395 nm | 395 nm | 395 nm | 395 nm |
| | B2 | −5.4912E−03 | −5.4912E−03 | −5.4912E−03 | −5.4912E−03 |
| | B4 | 2.3942E−03 | 2.3942E−03 | 2.3942E−03 | 2.3942E−03 |
| | B6 | 1.7081E−03 | 1.7081E−03 | 1.7081E−03 | 1.7081E−03 |
| | B8 | −8.9650E−04 | −8.9650E−04 | −8.9650E−04 | −8.9650E−04 |
| | B10 | 2.6700E−04 | 2.6700E−04 | 2.6700E−04 | 2.6700E−04 |
| Optical path difference function | Diffraction order | 0/0/1 | | | |
| | Manufactured wavelength | 785 nm | | | |
| | B2 | 1.5968E−02 | | | |
| | B4 | −7.3725E−04 | | | |
| | B6 | −1.0009E−03 | | | |
| | B8 | 8.1423E−04 | | | |
| | B10 | −2.4796E−04 | | | |

| | | Surface no. | | | |
|---|---|---|---|---|---|
| | | 2-4 | 2-5 | 2-6 | 3 |
| | | | Area | | |
| | | $1.262 \leq h \leq 1.307$ | $1.307 \leq h \leq 1.355$ | $1.355 \leq h$ | |
| Aspheric surface coefficient | κ | −5.2821E−01 | −5.2092E−01 | −6.5466E−01 | −1.4057E+01 |
| | A0 | −1.4453E−02 | 1.7566E−02 | 3.2124E−04 | 0.0000E+00 |
| | A4 | 1.2948E−02 | 1.2639E−02 | 1.2109E−02 | 1.4339E−01 |
| | A6 | 2.6726E−03 | 2.6726E−03 | 6.8203E−04 | −1.3569E−01 |
| | A8 | 3.8605E−03 | 3.8605E−03 | 1.8368E−03 | 8.5457E−02 |

TABLE 3-continued

Example of a single diffractive lens Lens data

|  |  |  |  |  |  |
|---|---|---|---|---|---|
|  | A10 | −3.5626E−03 | −3.5626E−03 | −1.3166E−03 | −3.5414E−02 |
|  | A12 | 1.3965E−03 | 1.3965E−03 | 3.0609E−04 | 8.3196E−03 |
|  | A14 | 8.5125E−05 | 8.5125E−05 | 2.2270E−04 | −8.3492E−04 |
|  | A16 | −1.6888E−04 | −1.6888E−04 | −1.6894E−04 | 0.0000E+00 |
|  | A18 | 4.5316E−05 | 4.5316E−05 | 4.4386E−05 | 0.0000E+00 |
|  | A20 | −4.4456E−06 | −4.4456E−06 | −4.3121E−06 | 0.0000E+00 |
| Optical path difference function | Diffraction order | 2/1/1 | 2/1/1 |  |  |
|  | Manufactured wavelength | 395 nm | 395 nm |  |  |
|  | B2 | −5.4912E−03 | −5.4912E−03 |  |  |
|  | B4 | 2.3942E−03 | 2.3942E−03 |  |  |
|  | B6 | 1.7081E−03 | 1.7081E−03 |  |  |
|  | B8 | −8.9650E−04 | −8.9650E−04 |  |  |
|  | B10 | 2.6700E−04 | 2.6700E−04 |  |  |
| Optical path difference function | Diffraction order |  |  |  |  |
|  | Manufactured wavelength |  |  |  |  |
|  | B2 |  |  |  |  |
|  | B4 |  |  |  |  |
|  | B6 |  |  |  |  |
|  | B8 |  |  |  |  |
|  | B10 |  |  |  |  |

An example of the collimator lens formed of plastic material used in the objective lens of this Example 1, Example 2, Comparative Example is shown in Table 4. Hereupon, Table 4 shows numeric values as an example when used in Example 1.

TABLE 4

Example of PLASTIC normal collimator Lens data

| Collimator focal distance | | f = 17.5 mm@BD, 18.1 mm@DVD, 18.2 mm@CD | | | | | |
|---|---|---|---|---|---|---|---|
| i-th surface | ri | di(405 nm) | ni(405 nm) | di(658 nm) | ni(658 nm) | di(785 nm) | ni(785 nm) |
| 0 | ∞ | ∞ |  | ∞ |  | ∞ |  |
| 1(stop diameter) | ∞ | 0.0 (φ4.2 mm) |  | 0.0 (φ4.2 mm) |  | 0.0 (φ4.2 mm) |  |
| 2 | 10.9657 | 1.900 | 1.545 | 1.900 | 1.527 | 1.900 | 1.524 |
| 3 | −68.6939 | 5.000 |  | 5.000 |  | 5.000 |  |
| 4(prism) | ∞ | 8.000 | 1.530 | 8.000 | 1.514 | 8.000 | 1.511 |
| 5 | ∞ | 6.145 |  | 6.661 |  | 6.764 |  |
| 6(light source) | ∞ |  |  |  |  |  |  |

| | | surface no. | |
|---|---|---|---|
| | | 2 | 3 |
| Aspheric surface coefficient | κ | −6.3761E−01 | −3.8132E+01 |

The wavelength characteristic of Example 1 and in wavelength 405 nm of the optical system structured by the collimator lens is $|\delta SA3_{obj+col}/\delta\lambda|=0.0266$ λms/° C., the temperature characteristic is $|\delta SA3_{obj+col}/\delta T|=0.0004$ λms/° C. In this manner, when the objective lens and the normal collimator lens whose both surfaces are composed of the refractive surfaces, formed of so-called plastic material are combined and used, the temperature characteristic is further decreased than the objective lens single body by about 0.001. Hereupon, when the above collimator lens is used for Example 2, Comparative example, the optical axis direction position is adjusted corresponding to the difference of the specification and used.

When Example 1 and the Comparative example are compared, it is clear that when the temperature characteristic is improved, the wavelength characteristic is deteriorated. In the optical pickup apparatus for which objective lens of the Comparative example is used, when the environmental temperature rises by 30° C., the 3rd order spherical aberration $SA3_{obj}$ due to the temperature change becomes 0.159 λms/° C. exceeding over Marechal's criterion and can not be used. On the one hand, in the case of the optical pickup apparatus in which the objective lens of Example 1 is combined with the semiconductor laser of the oscillation wavelength 408 nm, the 3rd order spherical aberration $SA3_{obj}$ due to the wavelength change becomes 0.0861 λms/° C. exceeding over Marechal's criterion and can not be used.

In contrast to this, in the case of the optical pickup apparatus in which the objective lens of Example 2 is combined with the semiconductor laser of the oscillation wavelength 408 nm, because the 3rd order spherical aberration $SA3_{obj}$ due to the temperature change when the environmental temperature rises by 30° C., is 0.051 λms/° C., and a deviation between an oscillation wavelength of a light source and a design wavelength of an objective lens is zero, the 3rd order spherical aberration $SA3_{obj}$ due to the wavelength change is 0 λms/° C., it can be seen that both stay within the usable values.

Incidentally, lens data in Example 1, Example 2, and Comparative Example shows a proper example for use in an optical pickup apparatus for recording/reproducing information appropriately for BD and DVD as an embodiment and the maximum image side numerical aperture in each example is 0.85. Both of the objective lenses in Example 1 and Example 2 are corrected well with regard to $5^{th}$ or more order spherical aberration and, by combining the respective objective lenses with respective laser light sources having an oscillation wavelength adapted to the design wavelength of their diffractive structures, an initial adjustment at the time of assembling them in an optical pickup apparatus can be simplified.

What is claimed is:

1. A method of manufacturing an optical pickup apparatus, comprising steps of:
   preparing plural different types of objective lenses having respective different optical path difference providing structures designed based on respective different design wavelengths;
   selecting one type objective lens from the plural different types of objective lenses in accordance with an oscillation wavelength of a laser light source; and
   assembling the selected type objective lens and the laser light source into the apparatus,
   wherein the selected type objective lens is made of a plastic, is provided with the optical path difference providing structure on at least one surface thereof and satisfies the following expression:

$0.01 \leq |\delta SA3_{obj}/\delta\lambda| < 0.01 (\lambda rms/nm)$ where $\delta SA3_{obj}/\delta\lambda$ represents the wavelength dependency of the 3rd order spherical aberration of the objective lens when an oscillation wavelength is fluctuated between ±2nm from a reference wavelength of 500 nm or less.

2. The method described in claim 1, wherein the light source is a light source having an oscillation wavelength of 500 nm or less.

3. The method described in claim 1, wherein the objective lens is structure with a single lens.

4. The method described in claim 1, wherein the respective different design wavelengths are provided with respective differences from a predetermined reference wavelength.

5. A method of manufacturing an optical pickup apparatus, comprising steps of:
   preparing an objective lens having an optical path difference providing structure designed based on a predetermined design wavelength;
   selecting one light source from plural laser light sources different in oscillation wavelength in accordance with the predetermined design wavelength of the optical path difference providing structure of the objective lens; and
   assembling the objective lens and the selected laser source into the apparatus,
   wherein the objective lens is made of a plastic, is provided with the optical path difference providing structure on at least one surface hereof and satisfies the following expression:

$0.01 \leq |\delta SA3_{obj}/\delta\lambda| < 0.1 (\lambda rms/nm)$ where $\delta SA3_{obj}/\delta\lambda$ represents the wavelength dependency of the 3rd order spherical aberration of the objective lens when an oscillation wavelength is fluctuated between ±2nm from a reference wavelength of 500 nm or less.

6. The method described in claim 5, further comprising:
   preparing plural different types of objective lenses including the objective lens which have respective optical path difference providing structures designed based on respective different design wavelengths, and wherein the objective lens is selected from the plural different types of objective lenses.

7. The method described in claim 5, wherein the light source is a light source having an oscillation wavelength of 500 nm or less.

8. The method described in claim 5, wherein the objective lens is structure with a single lens.

9. A method of manufacturing an optical pickup apparatus, comprising steps of:
   classifying plural objective lenses which are made of a plastic, have respective optical path difference providing structures on at least one surface and satisfy the following expression, into plural types in accordance with the specification of the respective optical path difference providing structures;
   selecting one type objective lens from the plural types in accordance with an oscillation characteristic of a laser light source to be used; and
   assembling the laser source and the selected type objective, $0.01 \leq |\delta SA3_{obj}/\delta\lambda| < 0.1 (\lambda rms/nm)$ where $\delta SA3_{obj}/\delta\lambda$ represents the wavelength dependency of the 3rd order spherical aberration of the objective lens when an oscillation wavelength is fluctuated between ±2nm from a reference wavelength of 500 nm or less.

10. The method described in claim 9, wherein when a delivery lot of the manufactured optical pickup apparatus is inspected, the following expression is satisfied, $\sigma_{SA3} \leq \sigma\lambda \cdot \delta SA3/\delta\lambda$ where, $\sigma_{SA3}$ (λrms) represents the standard deviation of the 3rd order spherical aberration SA3 of the light-converging optical system (from the light source to the information recording surface) including the objective lens of the optical pickup apparatus for the wavelength when the laser light source is oscillated at the reference temperature with the reference output in respective optical pickup apparatus, in the delivery lot of the optical pickup apparatus,
    $\sigma_\lambda$(nm) represents the standard deviation of the oscillation wavelength at the reference temperature with the reference power of the laser included in the delivery lot of the optical pickup apparatus, and
    $\delta SA3/\delta\lambda$ (λrms/nm) represents the wavelength dependency of the 3rd order spherical aberration of the light-converging optical system (from the light source to the information recording surface) including the objective lens included in the delivery lot of the optical pickup apparatus.

11. The method described in claim 9, wherein the objective lenses are provided with respective identification marks for each different type.

12. The method described in claim 9, wherein the objective lenses satisfy the following expression:

$0.02 \leq |\delta SA3_{obj}/\delta\lambda| < 0.1 (\lambda rms/nm)$

13. The method described in claim 9, wherein the objective lenses satisfy the following expression:

$|SA3_{obj}| \leq 0.030 (\lambda rms)$ where $SA3_{obj}$ represents the 3rd order spherical aberration of the objective lens for the oscillation wavelength when a laser light source incorporated in the optical pickup apparatus oscillates with a reference output under a reference temperature.

14. The method described in claim 9, wherein the objective lenses satisfy the following expression:

$|\delta SA3_{obj}/\delta T| \leq 0.002 (\lambda rms/°C.)$ where $|\delta SA3_{obj}/\delta T|$ represents the temperature dependency of the 3rd order spherical aberration of the objective lens when an wavelength fluctuation for a temperature change in an oscillation wavelength of 500 nm or less is made +0.05 nm/° C.

15. The method described in claim 9, wherein the optical pickup apparatus comprises a first light source having an oscillation wavelength λ1 of 500 nm or less and a second light source having an oscillation wavelength λ2 (λ1 <λ2), and the objective lens converges a light flux from the first light source through a protective substrate having a thickness t1 onto an information recording surface of a first information recording medium so as to conduct recording and/or reproducing information and converges a light flux from the second light source through a protective substrate having a thickness t2 (t1≦t2) onto an information recording surface of a second information recording medium so as to conduct recording and/or reproducing information, and wherein the objective lens is made of a plastic and includes a diffractive structure on at least one surface in which a diffraction order having the maximum diffraction efficiency is different between a case that a light flux from the first light source passes through and a case that a light flux from the second light source passes through.

16. The method described in claim 9, wherein the objective lenses have an image side maximum numerical aperture of 0.8 or more.

17. The method described in claim 9, wherein the objective lenses are structured with a single lens.

18. An optical pickup apparatus, comprising:
the laser light source, and
the objective lens selected by the method described in claim 9.

* * * * *